United States Patent [19]

Catlett

[11] E Re. 30,250

[45] Reissued Apr. 8, 1980

[54] ELECTROMECHANICALLY OPERATED DOCKBOARD

[75] Inventor: John C. Catlett, Avon, Conn.

[73] Assignee: Kelley Company, Inc., Milwaukee, Wis.

[21] Appl. No.: 854,499

[22] Filed: Nov. 23, 1977

Related U.S. Patent Documents

Reissue of:

[64] Patent No.: 4,012,804
Issued: Mar. 22, 1977
Appl. No.: 699,469
Filed: Jun. 24, 1976

[51] Int. Cl.[2] ..... E01D 1/00
[52] U.S. Cl. ..... 14/71.3
[58] Field of Search ..... 14/71.7, 71.3; 214/38 BA

[56] References Cited

U.S. PATENT DOCUMENTS

| | | | |
|---|---|---|---|
| 1,106,074 | 8/1914 | Bidlake | 14/72.5 |
| 1,884,636 | 10/1932 | Faus | 14/72.5 X |
| 1,905,947 | 4/1933 | Morgan | 14/71.1 |
| 2,560,064 | 7/1951 | Astry | 14/71.7 X |
| 2,700,169 | 1/1955 | Henion | 14/71.5 |
| 2,904,802 | 9/1959 | Hartman | 14/71.3 |

*Primary Examiner*—Nile C. Byers, Jr.
*Attorney, Agent, or Firm*—Andrus, Sceales, Starke & Sawall

[57] ABSTRACT

An electromechanically operated dockboard. The dockboard includes a ramp hinged at its rear edge to a supporting frame and the ramp is adapted to be moved from a generally horizontal cross traffic position to an upwardly inclined position by operation of a recirculating ball screw unit, which is connected between the frame and the ramp and is driven by a permanent magnet motor. A lip is hinged to the front edge of the ramp and can be pivoted from a pendant, downwardly hanging position to an extended position where it forms an extension to the ramp. Deactivation of the ball screw unit, after the ramp is elevated, causes the ramp to fall by gravity, and as the ramp descends, the lip is lifted to the extended position where it will engage the bed of the truck. During the descent of the ramp the ball screw unit is driven in a reverse direction and the permanent magnet motor serves as a brake to control the speed of descent.

17 Claims, 7 Drawing Figures

Fig. 1
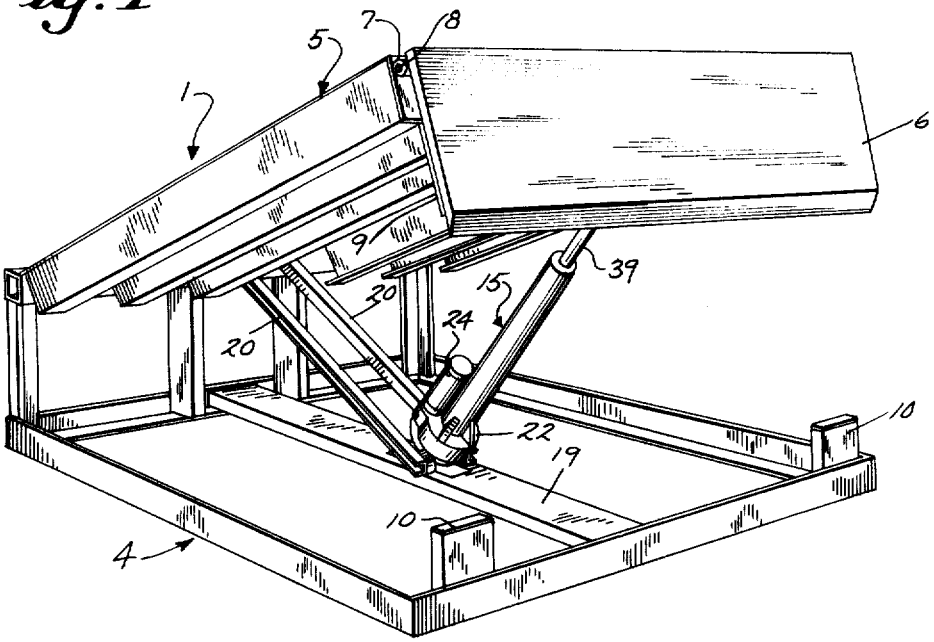
Fig. 4
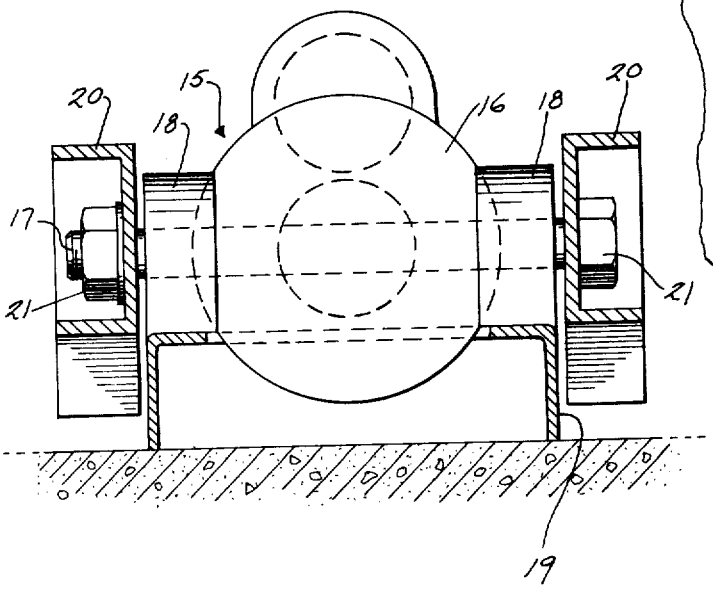
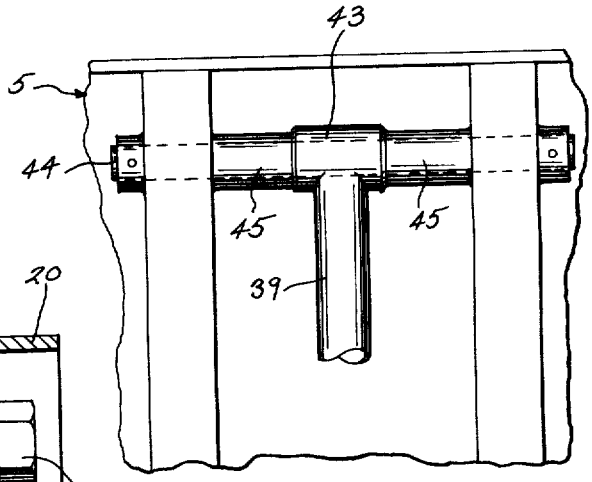
Fig. 5

ELECTROMECHANICALLY OPERATED DOCKBOARD

Matter enclosed in heavy brackets [ ] appears in the original patent but forms no part of this reissue specification; matter printed in italics indicates the additions made by reissue.

BACKGROUND OF THE INVENTION

An adjustable pit-mounted dockboard includes a ramp having its rear end hinged to the supporting structure or frame, and the ramp is movable from a generally horizontal cross traffic position to an upwardly inclined position. Hinged to the front edge of the ramp is an extension lip which is adapted to swing from a pendant position, in which the lip hangs downwardly from the front edge of the ramp, to an extended position in which the lip forms an extension to the ramp. The lip, when in the extended position, is adapted to engage the bed of a truck or carrier located in front of the dock and bridges the gap between the ramp and a truck bed to enable material handling equipment to move between the dock and the truck.

In an upwardly biased-type of dockboard, the ramp is biased upwardly to the inclined position by a spring assembly, and a manually releasable holddown mechanism is employed to hold the ramp against upward movement. The holddown mechanism is a uni-directional device which prevents upward movement of the ramp through the force of the spring assembly, unless released, while permitting free downward movement of the ramp.

With an upwardly biased type of dockboard, the ramp, when in the upwardly inclined position, must be walked down by the operator in order to engage the extended lip with the truck bed. To walk down the ramp, the operator moves outwardly on the ramp and the weight of the operator, in combination with the weight of the ramp, will overcome the biasing action of the spring assembly so that the ramp is lowered until the lip engages the truck bed.

A second common type of dockboard is a downwardly biased or nose-heavy board in which the weight of the ramp will move the ramp downwardly. A downwardly biased dockboard requires an auxiliary force to move the ramp from the cross traffic position to the upwardly inclined position, and this auxiliary force can take the form of hydraulically operated cylinders, truck actuated linkages, or the like. With the ramp elevated, the auxiliary force is removed, and the ramp will descend by gravity until the extended lip contacts the truck bed.

A downwardly biased dockboard has an advantage in that no holddown mechanism is required, as used in an upwardly biased dockboard, and the loading at the hinge connection of the ramp to the dock or frame is reduced. Furthermore, the ramp will descend by gravity and downward movement of the ramp is not subject to the varying weight of the operator.

SUMMARY OF THE INVENTION

The invention is directed to an electromechanically operated, downwardly biased, dockboard. The dockboard of the invention is mounted in a pit or depression in the loading dock and includes a ramp that is hinged at its rear end to the supporting structure or frame, and the ramp is adapted to be moved from a generally horizontal cross traffic position to an upwardly inclined position by operation of a recirculating ball screw unit, which is pivotally interconnected between the supporting structure and the ramp and is driven by a D.C. motor.

Hinged to the forward edge of the ramp is an extension lip that is adapted to swing from a pendant position, in which the lip hangs downwardly from the front edge of the ramp, to an extended position in which the lip forms an extension to the ramp.

To begin the loading or unloading operation, the ball screw is operated to pivot the ramp to the upwardly inclined position. The ball screw drive unit is then deactivated to permit the ramp to fall by gravity, and as the ramp descends, the lip is moved outwardly from the pendant position and latched in a partially extended position, short of its fully extended position. During descent of the ramp, the ball screw drive unit is driven in a reverse direction, and the motor serves as a brake to control the speed of descent. When the partially extended lip engages the bed of the carrier, the lip will move to the fully extended position, thereby releasing the lip latch mechanism and enabling the lip to fall to the pendant position when the truck or carrier moves away from the loading dock.

The use of the ball screw drive, in combination with the permanent magnet motor, acts to elevate the ramp, and on deactivation of the motor, the weight of the ramp will drive the unit in the opposite direction, with the motor operating as a generator to control the speed at which the extended lip is lowered onto the truck bed.

The electromechanical drive unit of the invention also provides a built-in floating action for the ramp during loading and unloading operations. An important factor in the dockboard operation is that the ramp must be capable of moving up or down, or float, when resting on the truck bed. For example, as cargo is unloaded from the truck bed, the rear truck springs will move the truck bed upwardly, and the ramp must be able to move with the rising truck bed. On the other hand, when cargo is being loaded on the truck bed, the truck bed will move downwardly, relative to the loading dock, and the ramp must be able to follow the downward movement of the bed. The use of the ball screw enables the ramp to follow the floating action of the truck bed without damage to the drive.

The electromechanical drive unit is capable of operating in a wide range of temperatures and the unit is easily serviced and maintained.

Other objects and advantages will appear in the course of the following description.

DESCRIPTION OF THE DRAWINGS

The drawings illustrate the best mode presently contemplated of carrying out the invention.

In the drawings:

FIG. 1 is a perspective view of a dockboard incorporating the electromechanical drive unit of the invention with the ramp shown in the raised position;

FIG. 4 is a section taken along line 4—4 of FIG. 1;

FIG. 5 is a section taken along line 5—5 of FIG. 1;

DESCRIPTION OF THE ILLUSTRATED EMBODIMENT

Figure 2:
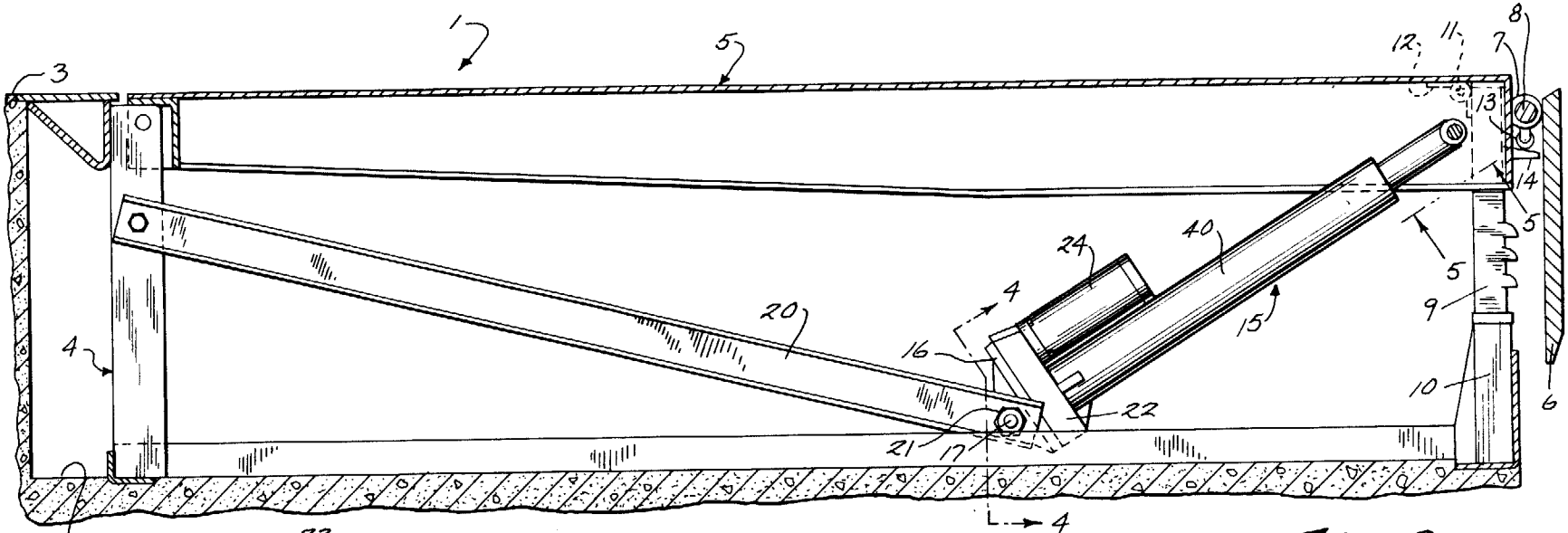
FIG. 2 is a vertical section of the dockboard of FIG. 1 showing the ramp in the cross traffic position.

FIGS. 1-5 illustrate an adjustable pit-mounted dockboard 1, which is mounted in a pit or depression 2 in a loading dock 3. The dockboard 1 includes a frame or supporting structure 4 and a ramp 5 is hinged at its rear edge to the frame and is adapted to be moved between a generally horizontal cross traffic position and an upwardly inclined position. Hinged to the forward edge of the ramp is an extension lip 6. The lip 6 and ramp 5 carry aligned hinge tubes 7 which receive a hinge pin 8. With this construction the lip can be pivoted from a downwardly hanging pendant position, as shown in FIG. 2, to an outwardly extended position, in which the lip forms an extension to the upper surface of the ramp. Engagement of the rear edge of the lip 6 with the forward surface of the ramp 5 prevents the lip from moving beyond the extended position in which it is generally flush with the ramp.

To support the ramp 5 in the generally horizontal cross traffic position, a pair of supporting legs 9, similar in construction to those shown in U.S. Pat. No. 3,137,017, are utilized. The supporting legs 9 are pivotable between an upright supporting position, as shown in FIG. 2, in which the legs rest on supports 10 extending upwardly from frame 4 to support the ramp in a horizontal position. As shown in FIG. 2, the upper end of each cross traffic leg 9 is pivoted to the undersurface of the ramp 5 through a pivot connection indicated by 11 and torsion springs 12 urges the legs to the upright supporting position.

The supporting legs 9 are moved to the retracted position in a manner similar to that shown in U.S. Pat. No. 3,137,017, and this mechanism includes a roller or projection 13 which is attached to one of the hinge tubes 7 and is adapted to ride against a wiper 14 attached to the leg, so that as the lip is moved from the pendant toward the extended position, the legs 9 will be moved from the upright supporting position to the retracted position.

Figure 3:
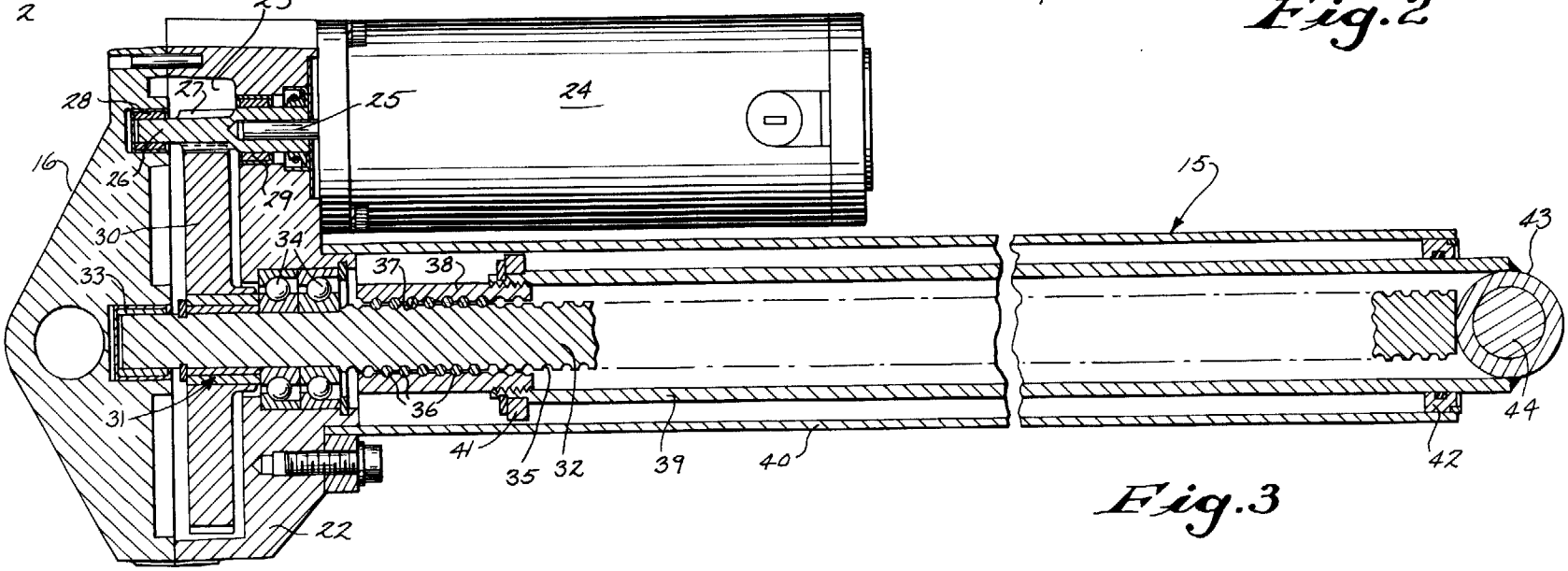
FIG. 3 is a longitudinal section of the drive unit.

In accordance with the invention, a recirculating ball screw unit 15 is interconnected between the frame 4 and the ramp, and operation of the ball screw unit acts to elevate the ramp. As shown in FIG. 3, the ball screw drive unit 15 includes a base plate 16 which is pivotally connected to the supporting structure or frame 4. To provide the pivotal connection, a rod 17 extends through aligned openings in the base 16 and in bearing blocks 18 which extend upwardly from base channel 19. The threaded ends of rod 17 project through openings in diagonal channel braces 20 and receive nuts 21. The rear ends of channels 20 are secured to vertical structural members of frame 4, as shown in FIG. 2.

A housing 22 is bolted to the base 16 of the drive unit and the base and housing define a gear chamber 23. A permanent magnet or wire wound DC motor 24 is mounted on the housing 22, and the motor drive shaft 25 is coupled to a shaft 26 that carries pinion 27. Shaft 26 is journalled for rotation within the base and housing, respectively, by bearing units 28 and 29. The pinion 27 drives a gear 30 which is located within chamber 23, and the gear is connected through an overrunning clutch 31 to one end of the lead screw 32. The end of the lead screw 32 is journalled within a needle bearing assembly 33 located within a recess in the base 16, while the portion of the screw located forward of the gear 30 is journalled within ball bearing assemblies 34.

The lead screw 32 is provided with a spiral groove 35, and a series of ball bearings 36 are mounted within the groove 35, as well as in a groove 37 in a nut 38. Rotation of the screw 32 will cause the nut 38 to move along the length of the screw and the balls 36 are recirculated from one end of the nut to the other in a conventional manner.

As shown in FIG. 3, a tube 39 is threaded on the outer surface of the nut 38 and extends forwardly surrounding the screw 32. An outer sleeve 40 is secured to the housing 22 and is located in spaced relation around the tube 39.

Rotation of the screw 32 will cause the nut 38 and tube 39 to move axially of the screw and sleeve 40, and forward or outer movement of the nut and tube is limited by engagement of a stop collar 41 on tube 39 with the ring 42 on the sleeve 40.

As illustrated in FIG. 5, the outer end of tube 39 carries a hinge tube 43 and a pin 44 extends through the hinge tube 43, as well as hinge tubes 45 connected to the ramp. With this construction, the tube 39 is pivotally connected to the ramp 5.

The lip 6 is adapted to be moved from the pendant position toward the extended position as a consequence of downward movement of the ramp 5 from the elevated position toward the horizontal or cross traffic position. The lip lifting and latching mechanism can be similar to that shown in the copending U.S. Pat. application Ser. No. 532,501, filed Dec. 13, 1974.

The lip lifting and latching mechanism of the above patent application, in itself, does not form a part of the present invention and for purposes of clarity is not shown in the drawings, but is, however, incorporated by references herein. In general, the lip lifting and latching mechanism as described in the aforementioned patent application, acts to pivot the lip 6 from the pendant position toward the elevated position of the ramp and further acts to latch the lip in a partially extended position, just short of the fully extended position. On further descent of the ramp, the lip will engage the bed of a truck or carrier, moving the lip to the fully extended position and removing the weight of the lip from the lip latch, so that the latch will be released and the lip can fall freely to the pendant position when the truck pulls away from the dock.

OPERATION

The ramp will normally be in the horizontal cross traffic position, as shown in FIG. 2, with the cross traffic legs 9 seated on the supports 10. When a truck moves into position in front of the loading dock, the drive unit 15 is actuated by operating the motor 24 causing the screw 32 to rotate and drive the nut 38 and tube 39 forwardly to thereby elevate the ramp to the upwardly inclined position, as shown in FIG. 1. At this time the lip 6 is still in the pendant position.

The motor 24 is then de-energized and the weight of the ramp 5 will cause the ramp to fall by gravity. Descent of the ramp will drive the tube 39 and nut 38 rearwardly, thereby rotating the screw 32 and corresponding driving the motor in the opposite direction. The motor thus functions as a generator to provide a controlled descent of the ramp.

As the ramp descends, the lip lifting mechanism will be operated to move the lip toward the extended position and as the lip swing forwardly the rollers 13 will engage the wipers 14 to thereby move the cross traffic legs 9 to the retracted position, as illustrated in FIG. 1.

As the ramp continues to descend, the extended lip 6 will engage the bed of the carrier, thereby moving the lip to the fully extended position and releasing the lip latch, thereby permitting the lip to drop to the pendant position when the truck pulls away from the dock.

If the ramp is at a slightly upwardly inclined position during the loading operation, meaning that the truck bed is at a higher level than the dock, movement of the truck away from the dock will cause the lip to fall to the pendant position, and simultaneously the torsion springs 12 will move the legs 9 back to the upright or supporting position so that the legs will engage the supports 10 to hold the dockboard in the cross traffic position.

If, on the other hand, the ramp, during the loading operation, is at a downwardly inclined position, meaning that the truck bed is at a lower level than the dock, movement of the truck away from the dock will enable the lip to fall to the pendant position, but due to the downward inclination of the ramp, the lower ends of the legs 9 will not be able to engage the supports 10. Consequently, the ramp 5 will descend until it engages a limit switch, not shown, located at the bottom of pit 2, and engagement of the switch will activate the drive unit 15 for a predetermined time period sufficient to elevate the ramp 5 to an above-dock-level position. The drive unit 15 will then be deactivated causing the ramp 5 to fall by gravity. As the ramp is above dock level at this time, the legs 9 will be in a position to engage supports 10 and support the ramp in the cross traffic position.

During loading and unloading operations, it is important that the lip 6 and ramp 5 be able to float vertically with changes in elevation of the truck bed. If the truck bed descends relative to the dock, as for example, when cargo is loaded onto the truck bed, the ramp will follow the descent of the truck bed, thereby driving the nut 38 and tube 39 rearwardly to drive the screw 32 in the reverse direction and this will act to drive the motor 24 in the reverse direction to provide a controlled descent. On the other hand, if the truck bed rises relative to the dock, as for example when cargo is removed from the truck bed, the corresponding ascent of the ramp will tend to move the tube 39 and nut 38 forwardly and correspondingly rotate the screw 32. The rotation of the screw will be transmitted back to the motor. As the ascent of the truck bed and the ramp may be relatively rapid, the corresponding rotation of the screw may not be immediately accommodated by the motor 24, with the result that substantial stress may be applied to the connection of the drive unit to the frame 4, tending to pull the drive unit upwardly away from the frame, and the clutch 31 is utilized for the purpose of disconnecting the drive to the motor under this condition to eliminate such stress.

Figure 6:
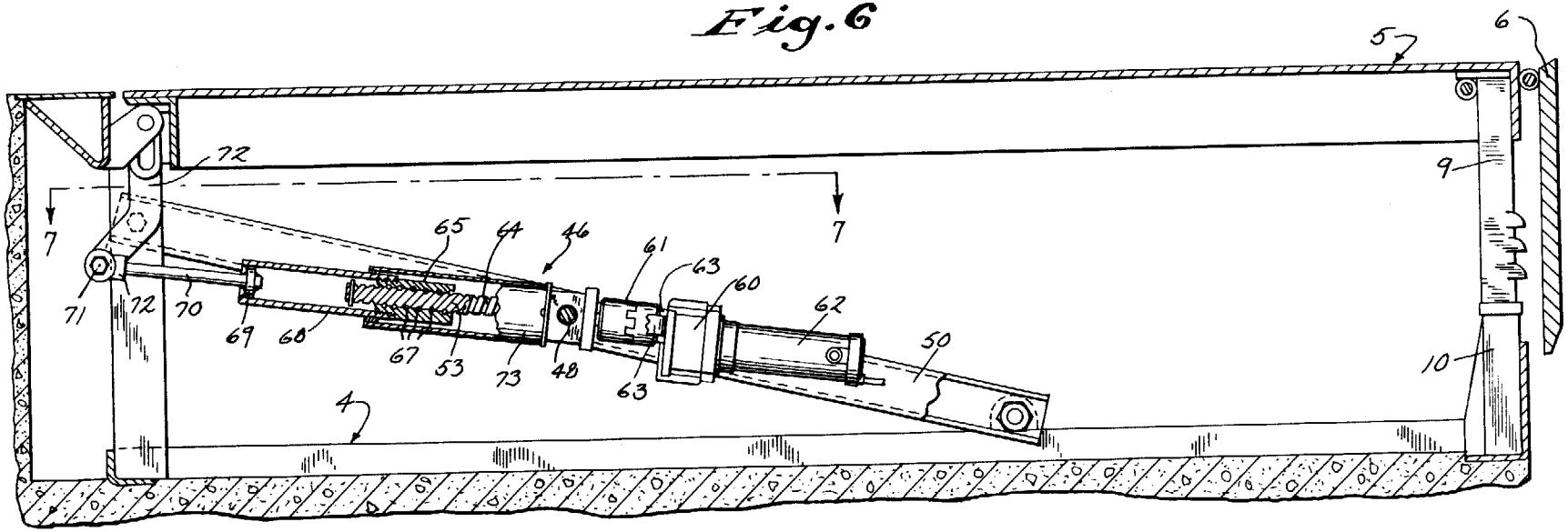
FIG. 6 is a vertical section of a dockboard incorporating a modified form of the electromechanical drive unit.
Figure 7:
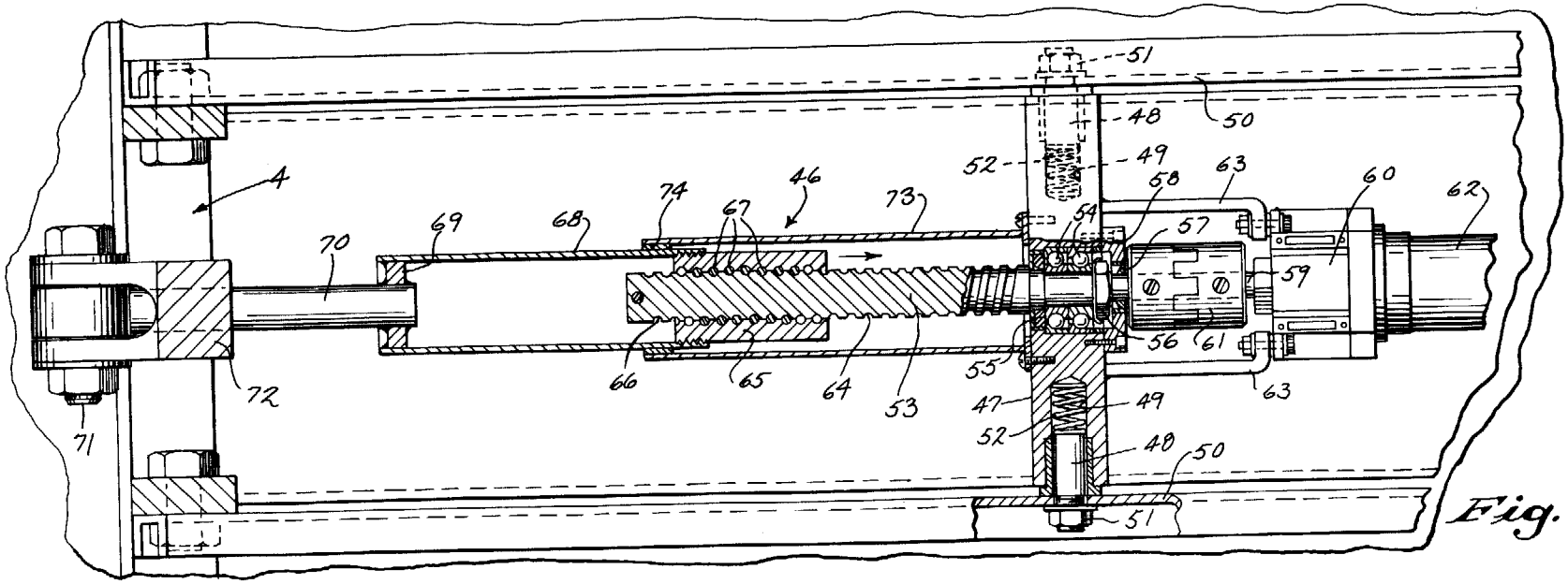
FIG. 7 is a section taken along line 7—7 of FIG. 6.

FIGS. 6 and 7 show a modified form of the invention in which a ball screw drive unit 46, similar to unit 15, is connected between the supporting structure 4 and the rear end of the ramp 5. The drive unit 46 includes a trunion 47 and pivot shafts 48 are journalled within bores or recesses 49 in the ends of the trunion. The outer threaded ends of shafts 48 extend through openings in the webs of channels 50 and are secured to the channels through nuts 51 which engage the threaded ends. As shown in FIG. 7, a coil spring 52 is located in the bottom of each recess 49 and urges the shafts 48 outwardly. When disassembling the structure, after removing nuts 51, each shaft 48 can be depressed against the force of the respective spring 52 in order to slip the end of the shaft out of the opening in the channel 50.

The forward end of a recirculating ball screw 53, similar to screw 32 of the first embodiment, is journalled within the trunion 47 by a pair of ball bearing assemblies 54. Seal 55 is located to the rear of the bearing assemblies 54, and the bearing assemblies are retained in position by a lock nut unit 56. A second seal assembly 57 provides a seal between the end of screw 53 and a cap 58 which is attached to trunion 47.

The forward end of the screw 53 is connected to the output shaft 59 of a speed reducing unit 60 by a coupling 61. The reducing unit 60 is driven by a DC permanent magnet motor 62, similar to motor 24 of the first embodiment.

The speed reducing unit 60 and motor 62 are mounted from trunion 47 by means of brackets 63.

The screw 53 is provided with a helical groove 64 and nut 65 is positioned around screw 53 and is formed with an internal helical groove 66. Balls 67 are disposed within the registering grooves 64 and 66 and are recirculated from one end of the nut to the other as the nut moves on the screw through a recirculating passage or conduit, not shown.

As shown in FIG. 7, a tube 68 is threaded to the outer surface of nut 65 and the rear end of the tube is connected by disc 69 to a rod 70. The outer end of rod 70 is pivotally connected by pin 71 to the lower forked end of lever arm 72, while the upper end of the lever arm is welded to the rear portion of the ramp 5, in a manner similar to that described in U.S. Pat. No. 3,528,118.

A sleeve 73 is mounted on the trunnion block 55 and is located outwardly in spaced relation to the screw 53 and nut 65. Located at the rear end of the sleeve 73 is an annular wiper member 74 which rides against the tube 68 as the tube 68 and nut 65 move relative to the screw 53 and sleeve 73.

The unit shown in FIGS. 6 and 7, operates in a manner similar to that described with respect to the first embodiment. Operation of the motor 62 will rotate the screw 53 to thereby move the nut 65 and tube 68 forwardly in the direction of the arrow in FIG. 7, to draw the lever arm 72 forwardly and elevate the ramp. After the ramp 5 has been moved to the upwardly inclined position, similar to the position shown in FIG. 1, power to the motor 62 is discontinued causing the ramp to fall by gravity. Downward movement of the ramp will drive the nut 65 and tube 68 rearwardly causing the screw 53 to rotate in the opposite direction, and thereby driving the motor 62 in the opposite direction to provide a braking action for the descent of the ramp.

Due to the fact that the drive unit 46 is connected to the rear end of the ramp, the stroke of the nut 65 and tube 68 is substantially less than that of the first embodiment in which the unit is connected to the forward end of the ramp. Furthermore, the floating action of the lip 6 and forward end of the ramp 5 during loading and unloading due to a change in level of the truck bed will be reflected in very minimal amounts of movement of the nut 74 with respect to the screw, and thus the drive unit 46 does not require the use of an overriding clutch, as in the first embodiment.

The use of the recirculating ball screw drive, in combination with the permanent magnet motor, acts to elevate the ramp and on deactivation of the motor, descent of the ramp will drive the unit in the opposite direction, with the motor then operating as a generator to control the rate of descent of the ramp.

The electromechanical drive unit also accommodates the floating action of the ramp during loading and unloading operations caused by changes in the level of the truck bed without damage to the ball screw drive or to the motor.

Various modes of carrying out the invention are contemplated as being within the scope of the following claims particularly pointing out and distinctly claiming the subject matter which is regarded as the invention.

I claim:

1. In a dockboard construction to be associated with a loading dock, a supporting structure mounted on the dock, a ramp structure hinged at its rear end to the supporting structure and disposed to pivot from a generally horizontal cross traffic position to an upwardly inclined position, a drive unit interconnecting the supporting structure and the ramp structure for pivoting the ramp from the cross traffic position to the upwardly inclined position, said drive unit including a screw member and a nut member connected with the screw member, a first of said members being connected to the supporting structure and the second of said members being connected to said ramp structure, *a base, said first member being supported by the base, means for pivoting the base to the supporting structure,* and a motor operably connected to the drive unit and being capable of being driven in one direction by a power source to effect relative movement between said nut member and said screw member to thereby move the ramp from the horizontal position to the upwardly inclined position, and said motor being driven in the reverse direction as the ramp structure descends by gravity from the inclined position toward the horizontal position to provide a dynamic braking action to control the descent of the ramp structure.

2. The dockboard construction of claim 1, wherein said motor is operably connected to said first member.

3. The dockboard construction of claim 1, wherein said screw member is connected to said supporting structure and said nut member is connected to the ramp structure, said motor being operably connected to the screw member to rotate said screw member, said nut member being moved along said screw member on rotation of said screw member to thereby move the ramp structure to the inclined position.

[4. The dockboard construction of claim 3, and including a base, said screw member being journalled for rotation on said base, and means for pivoting the base to the supporting structure.]

5. The dockboard construction of claim [4] *3,* wherein said motor is supported by said base.

6. The dockboard construction of claim 1, wherein said second of the members is connected to the forward end of the ramp structure.

7. The dockboard construction of claim 1, and including a lever connected to the rear end of the ramp structure, said second member being connected to the lever.

8. In a dockboard construction, a supporting structure, a ramp structure hinged at its rear end to the supporting structure and movable between a generally horizontal cross traffic position and an upwardly inclined position, a drive unit interconnecting the supporting structure and the ramp structure, said drive unit including a screw member having an external helical groove and also including a nut member having an internal helical groove, said drive member including a plurality of balls disposed within registering grooves in said screw member and said nut member, a first of said members being connected to the supporting structure and a second of said members being connected to the ramp structure, and a DC motor operably connected to the drive unit, operation of said motor in a first direction effecting relative movement between said nut member and said screw member in a first direction to thereby move the ramp structure from the cross traffic position to the upwardly inclined position, gravity descent of said ramp from the upwardly inclined position causing relative movement between said nut member and the screw member in the opposite direction to thereby drive the motor in an opposite direction, driving of the motor in an opposite direction producing a controlled descent of the ramp structure.

9. The dockboard construction of claim 8, wherein said screw member is connected to the supporting structure and the nut member is connected to the ramp structure, said motor being operably connected to the screw member to rotate the screw member and thereby move said nut member axially of said screw member.

10. The dockboard construction of claim 9, and including a base, said screw member being journalled for rotation on said base, and pivotal means for pivotally connecting the base to the supporting structure.

11. The dockboard construction of claim 9, and including means associated with the drive unit and responsive to upward floating movement of the ramp caused by elevation of the level of a truck bed disposed in front of the dock for disconnecting the screw member from the motor.

12. In a dockboard construction, a supporting structure, a ramp hinged at its rear edge to the supporting structure and movable between a generally horizontal cross traffic position and an upwardly inclined position, a lip hinged to the forward edge of the ramp and movable between a downwardly hanging pendant position and an extended position, a recirculating ball screw drive unit interconnecting the supporting structure and the ramp and including a base pivotally connected to the supporting structure, said drive unit also having a screw journalled for rotation with respect to the base and a nut engageable with said screw and movable along the length of said screw, said nut being connected to the ramp, and a DC permanent magnet motor operably connected to the screw to rotate the same, operation of the motor causing rotation of the screw in one direction to move the nut axially of the screw to thereby pivot the ramp from the cross traffic position to the upwardly inclined position, discontinuance of the operation of the motor causing the ramp to descend by gravity to move the nut axially of the screw and rotate the screw in the opposite direction, rotation of the screw in said opposite direction being transmitted to said motor to drive the motor in an opposite direction and brake the descent of the ramp.

13. The dockboard construction of claim 12, and including a tubular member interconnecting the nut and said ramp, said tubular member being disposed radially outward of said screw.

14. The dockboard construction of claim 12, wherein said nut has an internal helical groove and said screw has an external helical groove, and said drive unit includes a plurality of balls disposed in the registering grooves of the nut and the screw.

15. The dockboard construction of claim 12, wherein said motor has a drive shaft and is mounted on the base, and said construction includes gear means interconnecting the drive shaft of the motor and said screw.

16. The dockboard construction of claim 12, and including a connecting member interconnecting the nut and the ramp, said connecting member being connected to the forward portion of the ramp.

17. The dockboard construction of claim 12, and including a lever connected to the rear end portion of the ramp, a connecting member interconnecting the nut and the lever, whereby movement of said nut in a rear-to-front direction will act to pivot the ramp from the cross traffic position to the upwardly inclined position.

18. The dockboard construction of claim 12, wherein said motor has a drive shaft, and said construction includes clutch means having an engaged position wherein said drive shaft is operably connected to said screw and having a disengaged position, rapid upward movement of the ramp caused by elevation of the level of a truck bed disposed in front of the dock with the lip engaged with the truck bed acting to disengage said clutch means to prevent rotation of the screw from being transmitted to said motor.

* * * * *